(12) United States Patent
Langer

(10) Patent No.: US 9,852,093 B2
(45) Date of Patent: Dec. 26, 2017

(54) CONTROL DEVICE IN A MOTOR VEHICLE, A MOTOR VEHICLE, AND A METHOD FOR OPERATING A CONTROL DEVICE

(71) Applicant: AUDI AG, Ingolstadt (DE)

(72) Inventor: Niels-Stefan Langer, Hannover (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 15/127,314

(22) PCT Filed: Feb. 6, 2015

(86) PCT No.: PCT/EP2015/000246
§ 371 (c)(1),
(2) Date: Sep. 19, 2016

(87) PCT Pub. No.: WO2015/139799
PCT Pub. Date: Sep. 24, 2015

(65) Prior Publication Data
US 2017/0075835 A1     Mar. 16, 2017

(30) Foreign Application Priority Data

Mar. 20, 2014   (DE) .................. 10 2014 004 004

(51) Int. Cl.
| G06F 13/16 | (2006.01) |
| G06F 13/28 | (2006.01) |
| G06F 13/42 | (2006.01) |
| G06F 21/85 | (2013.01) |
| H04L 29/06 | (2006.01) |
| H04L 29/08 | (2006.01) |

(Continued)

(52) U.S. Cl.
CPC .............. *G06F 13/28* (2013.01); *G06F 9/544* (2013.01); *G06F 13/16* (2013.01);
(Continued)

(58) Field of Classification Search
CPC ...... G06F 13/16; G06F 13/1668; G06F 13/28; G06F 13/4282; G06F 9/544;
(Continued)

(56) References Cited

U.S. PATENT DOCUMENTS 7,490,350 B1    2/2009   Murotake et al.
9,098,462 B1 *  8/2015   McNicholl .......... G06F 13/1631
(Continued)

FOREIGN PATENT DOCUMENTS

CN            1251667         4/2000
CN          102486755         6/2012
(Continued)

OTHER PUBLICATIONS

Machine translation of JP2009265843, the prior publication of JP 5275673 B2.*
(Continued)

*Primary Examiner* — Eric Oberly
(74) *Attorney, Agent, or Firm* — Staas & Halsey LLP

(57) ABSTRACT

A communication device provides wireless communication between a controller in a motor vehicle and a network having at least one device external to the motor vehicle. The controller includes a computation device with at least two processor cores. Data interchange between the communication device and a first processor core takes place exclusively via a second of the processor cores.

15 Claims, 2 Drawing Sheets

(51) Int. Cl.
*H04W 12/08* (2009.01)
*H04W 4/04* (2009.01)
*G06F 15/167* (2006.01)
*G06F 9/54* (2006.01)
*G06F 21/74* (2013.01)

(52) U.S. Cl.
CPC ...... *G06F 13/1668* (2013.01); *G06F 13/4282* (2013.01); *G06F 15/167* (2013.01); *G06F 21/74* (2013.01); *G06F 21/85* (2013.01); *H04L 63/0209* (2013.01); *H04L 63/0227* (2013.01); *H04L 63/1441* (2013.01); *H04L 67/12* (2013.01); *H04W 4/046* (2013.01); *H04W 12/08* (2013.01)

(58) Field of Classification Search
CPC ........ G06F 15/167; G06F 21/74; G06F 21/85; H04L 63/0209; H04L 63/0227; H04L 63/1441; H04W 4/046; H04W 12/08
See application file for complete search history.

(56) References Cited

U.S. PATENT DOCUMENTS

| | | | |
|---|---|---|---|
| 2013/0179528 A1* | 7/2013 | Gianisis | G06F 15/167 709/213 |
| 2013/0219170 A1 | 8/2013 | Naitou et al. | |

FOREIGN PATENT DOCUMENTS

| | | |
|---|---|---|
| DE | 10234726 A1 | 2/2003 |
| DE | 102007045398 A1 | 4/2009 |
| DE | 102012207215 A1 | 10/2013 |
| DE | 102012105068 A1 | 12/2013 |
| DE | 102014004004.6 | 3/2014 |
| JP | 5275673 B2 * | 8/2013 |
| WO | 2013/156315 A1 | 10/2013 |
| WO | PCT/EP2015/000246 | 2/2015 |

OTHER PUBLICATIONS

WIPO translation of International Preliminary Examination Report on Patentability for PCT/EP2015/000246 dated Sep. 22, 2016.
Chinese Office Action dated Apr. 5, 2017 in corresponding Chinese Patent Application No. 201580014730.X.
International Search Report for PCT/EP2015/00246 dated Apr. 16, 2015.
German OA for Application No. 102014004004.6 dated Oct. 30, 2014.
"Application Note 179: Cortex-M3 Embedded Software Development" ARM, Limited; Mar. 2007, pp. 1-24.
"IS 300h Hybrid Navigation English", 2014, pp. 373-396, printed from myportalcontent.toyotaeurope.com/Manuals/Lexus/IS_Navi_EE_53B24E.pdf on Sep. 19, 2016.

* cited by examiner

218# CONTROL DEVICE IN A MOTOR VEHICLE, A MOTOR VEHICLE, AND A METHOD FOR OPERATING A CONTROL DEVICE

CROSS REFERENCE TO RELATED APPLICATIONS

This application is the U.S. national stage of International Application No. PCT/EP2015/000246, filed Feb. 6, 2015 and claims the benefit thereof. The International Application claims the benefit of German Application No. 10 2014 004 004.6 filed on Mar. 20, 2014, both applications are incorporated by reference herein in their entirety.

BACKGROUND

Described below are a controller in a motor vehicle, having a communication device for wireless communication in a network that has at least one device external to the motor vehicle, a motor vehicle and also a method for operating a controller in a motor vehicle.

In modern motor vehicles, it is becoming ever more usual for them also to be linked to external networks, particularly to the Internet. In this way, not only can added-convenience functions be provided, it is also possible to retrieve up-to-date information that is directly connected to guidance of the motor vehicle, for example as far as road condition, weather conditions and the like are concerned. In this context, the connection to the Internet is usually set up via a mobile radio network.

In order to produce such an "online connection" to an external network, it is known practice to provide a specific controller, which can be referred to as an "online connectivity unit" (OCU), for example. In such a controller, or connected thereto, there may also be a communication device, which can be implemented as a telephone module with an antenna and appropriate electronics, for example. Such communication modules are frequently also referred to as "network access device" (NAD). A connection to other vehicle systems from the controller is made via a bus system of the motor vehicle, modern motor vehicles frequently having multiple vehicle buses (bus systems). The controller therefore usually has a connection to one of these bus systems in order to be able to transmit data received from the network to other vehicle systems or in order to receive data sent to the network from the vehicle systems and to forward them to the communication device.

Whenever there is a connection to external networks, particularly the Internet, there is also a risk of attacks at electronics and software level, for example hacking and/or jamming attacks. The link to the network via the controller and the vehicle bus means that there is already an obstacle to potential attackers available, it nevertheless always being desirable to increase security.

SUMMARY

The controller described below has increased security against attacks from an external network, particularly the Internet.

A controller of the type cited at the outset has a computation device with at least two processor cores, wherein a data interchange between the communication device and a first processor core takes place exclusively via a second of the processor cores.

This means that within the controller there is a processor core that is devoted exclusively to data interchange between at least one further processor core and the communication device. This produces a multilevel security concept that defines three domains, namely firstly the vehicle-independent "backend domain", which is produced via the communication device, an "adaptation domain", which is provided by the second processor core, and finally the "vehicle domain", which is provided by the at least one first processor core and makes the vehicle-based functions of the controller available. In particular, the first processor core can therefore control the data interchange with at least one bus system of the motor vehicle and/or at least one further function to be performed by the controller. If the first processor core controls just the data interchange with the bus system of the motor vehicle, then a dedicated controller for linking to the network is implemented, for example as one of the already cited "online connectivity units". The security aspect becomes more relevant if the controller is also intended to perform further functions in the motor vehicle to which unauthorized access from outside, that is to say by the external network, needs to be avoided as far as possible.

In this context, one embodiment provides for the controller to be a networking controller having a connection device for multiple, particularly all, bus systems provided for communication between different vehicle systems, and for the first processor core to be designed to control the interchange of data between the bus systems and between the bus systems and the network. Such networking controllers, which are frequently also referred to as a "gateway", are already known, since motor vehicles frequently have multiple bus systems and certain data need to be present in multiple instances of these bus systems. A networking controller thus performs routing, in principle, the described embodiment provides for access to the external network to be integrated into the networking controller as well, so that any data interchange can be controlled at a single location. In this case, however, greater demands on security are also conceivable, since the networking controller may have access to all bus systems of the motor vehicle, of course, and therefore adopts a central position that should not be corrupted. In this regard, the provision of the second processor core, which is intended specifically for linking to the external network, proves to be particularly expedient, since there is an outstanding security concept. The reason is that even a compromise of the second processor core does not result in any influencing of the actual gateway processor core, that is to say of the at least one first processor core, since vulnerable parts of the software, for example a TCP/IP stack, are expediently encapsulated on the second processor core.

In this regard, the advantages of integration of the networking controller and of the linking to the external network, for example that there is a link to all vehicle buses and therefore data from the network can be passed directly to the target bus system, are obtained. There is therefore a wideband link. If a specific controller connected only to a single bus system, for example a CAN bus, were used, then all of the traffic to and from the external network would need to pass via this one bus system, which would be too heavily loaded, since most bus systems have limited bandwidth. If there is a need for communication between the external network and another bus system, then two vehicle buses would need to be kept "awake" for just one controller connected to a bus system, which means that there would be a higher quiescent current. In the case of the integrated solution presented here, a better quiescent current behavior can therefore be achieved. The integration additionally provides a monetary saving potential, since certain hardware components are no longer needed.

It is further advantageous if the processor cores are part of a multicore processor. Such multicore processors are already known in the related art and provide the basic hardware structure that allows individual processor cores to be assigned particular security-related functions and allows these to be largely compartmentalized. By way of example, it is possible to use what is known as a dual core processor.

In particular, the second processor core can thus create a demilitarized zone. Demilitarized zones are already known in the related art and are a kind of buffer region provided for security reasons, corruption of which from the outside is noncritical, since there are only clearly defined accesses to the actual system, provided by the at least one first processor core, the implementation of which accesses will be discussed in more detail below. In other words, in the figurative sense, the second processor core can also be envisaged as a kind of "firewall" that protects the actual vehicle systems from the external network, particularly the Internet.

A specific, embodiment provides for the computation device to have a memory device, wherein a memory area addressable exclusively by the second processor core is provided for communication between the first and the second processor core. Thus, a shared memory is used in order to allow communication between the first and the second processor core. The use of multicore processors in the computation device is particularly advantageous in this case, since the fundamentals for the relevant functionality already exist therein. Multicore processors usually have a memory device (RAM) that can basically be used by all processor cores of the multicore processor and is managed by a control unit. It is therefore possible to provide for one particular memory area of the memory device to be able to be addressed only by the second processor core, with additionally the second processor core also being provided with no kind of access to memory areas of the memory device other than the shared memory area. In this way, it is possible for the data interchange between the processor cores to take place in a defined manner.

The computation device can therefore, particularly as part of a multicore processor, include a control unit that is designed to control access to the memory device and that is configurable particularly exclusively via the first processor core. Such control units are also known by the name "memory protection unit" (MPU). In the present case, if communication only via the first processor core is permitted, even if the second processor core is compromised, the access rights thereof are not extendable.

One expedient development has provision for the processor cores to be designed for communication by the shared memory area via input/output buffers. In this case, the corresponding data objects/data packets that are stored in the input/output buffer are expediently in a particular format conducive to security and if need be can also be checked by the first processor core, or that is to say a specific software module provided therein. The input/output buffer is therefore the only clearly defined interface, via which the ideally already conditioned data can be received from the external network and forwarded thereto, which means that there is an extremely high level of security.

The second processor core may be designed to perform at least one security check and/or for a security-enhancing format conversion of the data received from the communication device. In particular, when data are received using the TCP/IP protocol, a check and format conversion can take place within the second processor core, which increases the overall security of the system further and makes further use of the possibilities of the second processor core.

Generally, the communication device and the computation device are naturally connected via a communication link that can be implemented as an SPI connection or a USB connection between the second processor core and the communication device, for example.

Finally, it should also be noted that the communication device may expediently be a WLAN interface and/or an interface to a mobile radio network, particularly with the intention of setting up a connection to the Internet.

Also described below is a motor vehicle that has a controller as described herein. All comments regarding the controller can be transferred analogously to the motor vehicle, which can therefore be used to obtain the same advantages.

Finally, a method for operating a controller in a motor vehicle, having a communication device for wireless communication in a network having at least one device external to the motor vehicle, and a computation device having at least two processor cores, is described in which data interchange between the communication device and a first processor core involves the use of exclusively a second of the processor cores. It also holds in relation to the method that the comments regarding the controller can be transferred mutatis mutandis, which means that the method also permits access to the cited advantages. In particular, it may thus be a method for operating the controller described herein.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
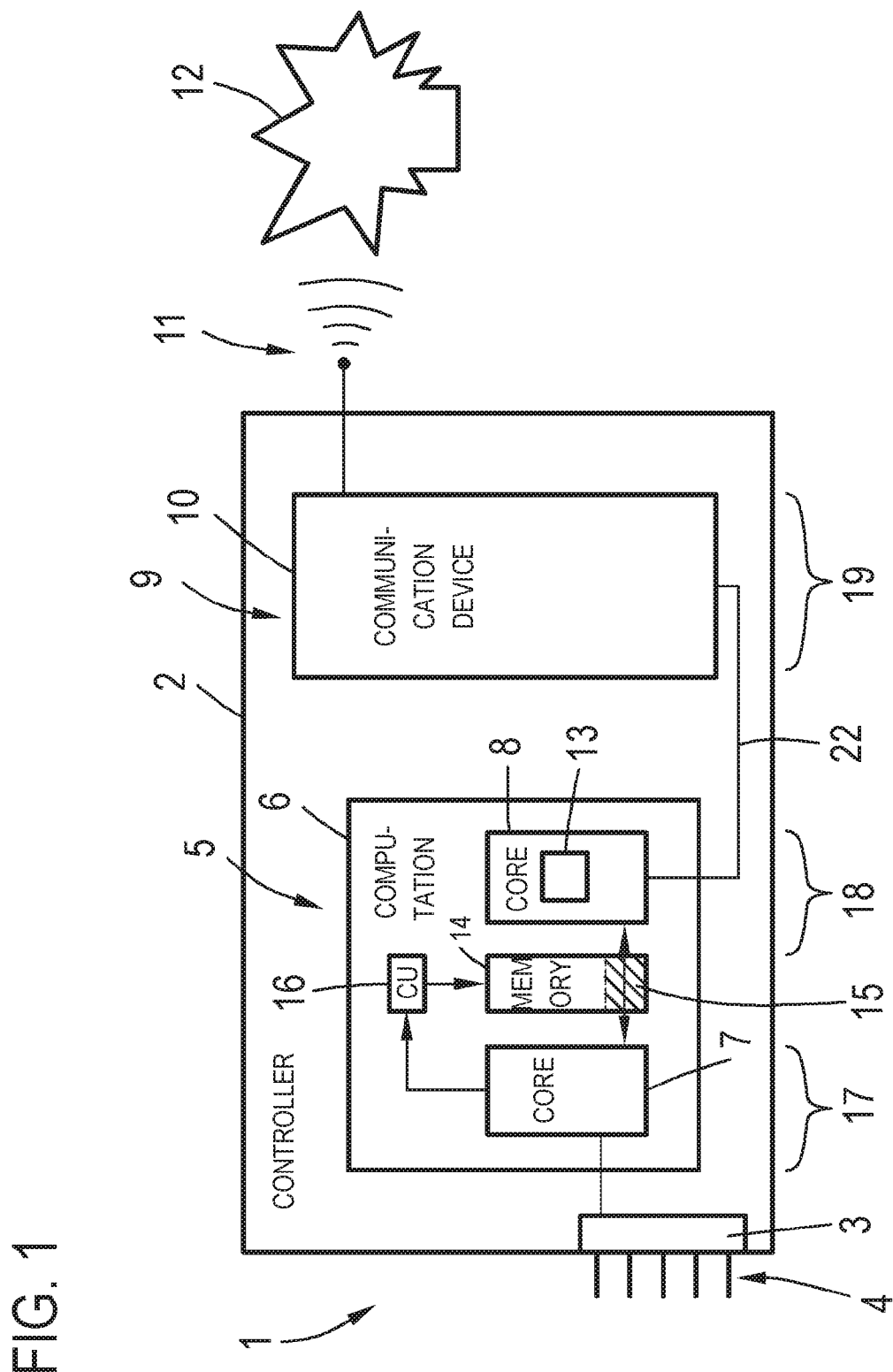
FIG. 1 is a block diagram of a controller.

Reference will now be made in detail to the preferred embodiments, examples of which are illustrated in the accompanying drawings, wherein like reference numerals refer to like elements throughout.

FIG. 1 is a block diagram of a controller 1. The present case involves a networking controller (gateway) that therefore has, on the housing 2, a connection device 3 for different bus systems 4 of the motor vehicle in which the controller 1 is installed. As a computation device 5, the controller 1 has a multicore processor 6, in this case a dual core processor having two processor cores 7, 8.

Installed in the controller 1, specifically in the same housing 2 as the computation device 5, there is also a communication device 9 in the present case, specifically a telephone module 10 (frequently also referred to as a NAD—network access device). In this way, a suitable antenna 11, which may be provided inside or outside the controller 1, can be used to set up a connection to an external network 12, in this case the Internet, via a mobile radio network.

The controller 1 in the form of a networking controller can therefore be referred to as a "connected gateway".

In order to improve security in respect of threats from the network 12, a second processor core 8 of the multicore processor 6 is used in the present case exclusively for transporting data from the communication device 9 to the first processor core 7, and vice versa. The first processor core is designed in this case not just for controlling the interchange of data between the bus system but also for controlling the interchange of data between the bus systems 4 and the network 12.

The second processor core 8 therefore forms a kind of protective wall, with the second processor core 8 specifically creating a demilitarized zone (DMZ). In the second processor core 8, as indicated by the small box 13, security checks and security-enhancing format conversions for the data received from the communication device 9 are performed. Security is increased further by virtue of a clearly defined memory area 15 in a memory device 14 of the multicore processor 6 being used for data interchange between the first processor core 7 and the second processor core 8. In this case, the second processor core 8 only has access to the memory area 15, not to the remainder of the address area of the memory device 14. This is catered for by a control unit 16 that acts as an MPU—Memory Protection Unit. The control unit 16 is configured such that it can be actuated only by the first processor core 7, and it is therefore not possible for the second processor core 8 to alter this memory assignment.

In this case, the data interchange via the memory area 15 takes place via input/output buffers, there being a clearly prescribed, security-enhancing interchange format that is distinguished by particular packet sizes and the like, for example.

Between the communication device 9 and the computation device 5, specifically the second processor core 8, there is a communication link, which in the present case is implemented as an SPI connection 22 but may also be a USB connection.

Hence, there is ultimately a split and clear division of functionalities within the controller 1, and therefore a three domain principle. A first domain is the vehicle domain 17, which, in the present case, is designed for the routing between the bus systems 4 and from and to the network 12, the latter involving the data transport running in a clearly defined manner via the shared memory area 15, the second processor core 8 and the communication device 9. The second processor core 8 forms the adaptation domain 18, in which data can be converted between different formats and security checks can be performed. This creates a demilitarized zone, which means that even if the second processor core 8 is corrupted, an attacker does not gain access to functions relevant to the vehicle that would be performed in the first processor core 7, which performs clearly defined communication, which may be subject to further security checks, only via the shared memory area 15.

The communication device 9 forms the vehicle-independent backend domain 19.

Figure 2:
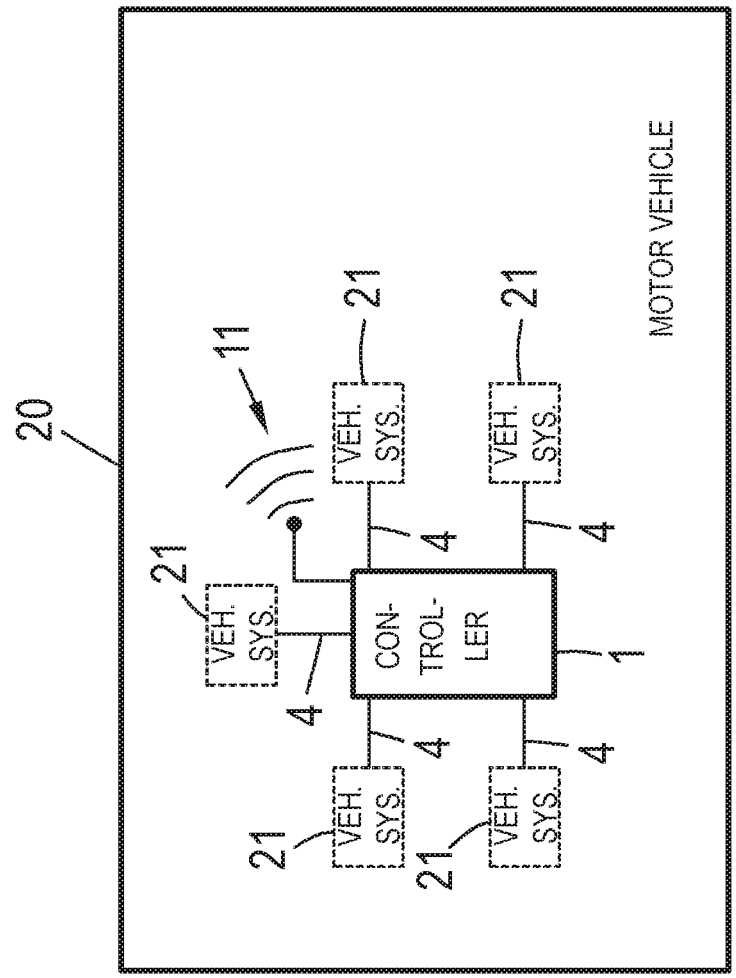
FIG. 2 is a block diagram of a motor vehicle.

FIG. 2 shows a basic outline of a motor vehicle 20. The motor vehicle uses the controller 1 as a networking controller, which is connected to all vehicle buses 4 for communication with further vehicle systems 21, which are only indicated in this case. The bus systems 4 in this case may be bus systems of different type, for example including CAN buses, FlexRay buses and Ethernet buses. The antenna 11 and the communication device 9 and also the demilitarized zone formed in the processor core 8 moreover allow a secure connection to the Internet, which means that data arriving externally are immediately present at the node for the vehicle buses 4.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A controller of a motor vehicle in wireless communication with a network having at least one device external to the motor vehicle, comprising:
   a communication device providing the wireless communication with the network; and
   a computation device having
      a multicore processor with at least two processor cores, including a first processor core performing data interchange with the communication device exclusively via a second processor core that creates a demilitarized zone,
      a control unit, and
      a memory device with a shared memory area, addressable by the second processor core, provided for communication between the first and second processor cores, the second processor core having no access to memory areas other than the shared memory area and no access to the control unit that configures the memory device.

2. The controller as claimed in claim 1,
   wherein the motor vehicle has at least one bus system, and
   wherein the first processor core controls at least one of data interchange with the at least one bus system of the motor vehicle and at least one further function performed by the controller.

3. The controller as claimed in claim 1, wherein the motor vehicle has multiple bus systems connected to different vehicle systems,
   wherein the controller further comprises a connection device connecting the multiple bus systems provided for communication between the different vehicle systems, and
   wherein the controller is a networking controller and the first processor core is configured to control the data interchange between the multiple bus systems and between the bus systems and the network.

4. The controller as claimed in claim 1, wherein the control unit is configured to control access to the memory device and is configurable exclusively via the first processor core.

5. The controller as claimed in claim 1, further comprising input/output buffers between the processor cores and the shared memory area.

6. The controller as claimed in claim 1, wherein the second processor core is configure to perform at least one of a security check and a security-enhancing format conversion of data received from the communication device.

7. The controller as claimed in claim 1, wherein the communication device and the computation device, via the second processor core, are connected by one of a Serial Peripheral Interface connection and a Universal Serial Bus connection.

8. A motor vehicle in wireless communication with a network having at least one device external to the motor vehicle, comprising:
   a controller including
      a communication device providing the wireless communication with the network; and
      a computation device having
         a multicore processor with at least two processor cores, including a first processor core performing data interchange with the communication device exclusively via a second processor core that creates a demilitarized zone,
a control unit, and
a memory device with a shared memory area, addressable by the second processor core, provided for communication between the first and second processor cores, the second processor core having no access to memory areas other than the shared memory area and no access to the control unit that configures the memory device.

9. The motor vehicle as claimed in claim 8,
further comprising at least one bus system, and
wherein the first processor core controls at least one of data interchange with the at least one bus system of the motor vehicle and at least one further function performed by the controller.

10. The motor vehicle as claimed in claim 8,
further comprising multiple bus systems connected to different vehicle systems,
wherein the controller further comprises a connection device connecting the multiple bus systems provided for communication between the different vehicle systems, and
wherein the controller is a networking controller and the first processor core is configured to control the data interchange between the multiple bus systems and between the bus systems and the network.

11. The motor vehicle as claimed in claim 8, wherein the control unit is configured to control access to the memory device and is configurable exclusively via the first processor core.

12. The motor vehicle as claimed in claim 8, further comprising input/output buffers between the processor cores and the shared memory area.

13. The motor vehicle as claimed in claim 8, wherein the second processor core is configure to perform at least one of a security check and a security-enhancing format conversion of data received from the communication device.

14. The motor vehicle as claimed in claim 8, wherein the communication device and the computation device, via the second processor core, are connected by one of a Serial Peripheral Interface connection and a Universal Serial Bus connection.

15. A method for operating a controller in a motor vehicle having a communication device for wireless communication in a network including at least one device external to the motor vehicle, and a computation device with at least two processor cores, said method comprising:
  interchanging data between the communication device and a first processor core in a multicore processor, exclusively via a second processor core of the multicore processor, that creates a demilitarized zone;
  communicating between the first and second processor cores via a memory device in the computation device having a shared memory area addressable by the second processor core; and
  preventing access by the second processor core to memory areas other than the shared memory area and to a control unit that configures the memory device.

* * * * *